United States Patent
Lowry et al.

(10) Patent No.: US 7,320,152 B2
(45) Date of Patent: Jan. 22, 2008

(54) SELF-LATCHING HINGE ASSEMBLY

(75) Inventors: David A. Lowry, Wayne, PA (US); Mark Cooper, Norristown, PA (US)

(73) Assignee: Southco, Inc., Concordville, PA (US)

( * ) Notice: Subject to any disclaimer, the term of this patent is extended or adjusted under 35 U.S.C. 154(b) by 130 days.

(21) Appl. No.: 11/188,228

(22) Filed: Jul. 22, 2005

(65) Prior Publication Data
US 2006/0048337 A1    Mar. 9, 2006

Related U.S. Application Data

(60) Provisional application No. 60/590,690, filed on Jul. 24, 2004.

(51) Int. Cl.
E05F 1/08 (2006.01)
E05C 17/64 (2006.01)
G06F 1/16 (2006.01)

(52) U.S. Cl. .................. 16/342; 16/303; 16/297; 16/330; 16/334; 16/340; 361/680; 361/681; 361/682; 361/683

(58) Field of Classification Search .................. 16/303, 16/297, 330, 334, 337, 340, 342; 361/680–683; 248/917–921; 379/433.13; 455/90.3, 575.1
See application file for complete search history.

(56) References Cited

U.S. PATENT DOCUMENTS

| | | | |
|---|---|---|---|
| 4,630,332 A | 12/1986 | Bisbing | |
| 4,630,333 A | 12/1986 | Vickers | |
| 5,406,678 A * | 4/1995 | Kaden et al. | 16/342 |
| 5,412,842 A | 5/1995 | Riblett | |
| 5,491,874 A * | 2/1996 | Lowry et al. | 16/342 |
| 5,697,125 A * | 12/1997 | Gannon | 16/342 |
| 5,752,293 A | 5/1998 | Lowry et al. | |
| 5,765,263 A | 6/1998 | Bolinas et al. | |
| 5,867,872 A * | 2/1999 | Katoh | 16/337 |
| 5,915,441 A | 6/1999 | Schlack | |
| 6,141,831 A | 11/2000 | Novin et al. | |
| 6,178,598 B1 | 1/2001 | Creely, III et al. | |
| 6,182,330 B1 | 2/2001 | Novin et al. | |
| D439,130 S | 3/2001 | Ford et al. | |
| 6,301,748 B1 * | 10/2001 | Su-Man | 16/342 |
| 6,421,878 B1 * | 7/2002 | Kaneko et al. | 16/330 |
| 6,467,129 B1 * | 10/2002 | Bae | 16/342 |
| 6,757,940 B2 * | 7/2004 | Lu et al. | 16/330 |
| 6,862,779 B1 * | 3/2005 | Lu et al. | 16/340 |
| 6,871,384 B2 | 3/2005 | Novin et al. | |

(Continued)

Primary Examiner—J J Swann
Assistant Examiner—David C Reese
(74) Attorney, Agent, or Firm—Paul & Paul

(57) ABSTRACT

A hinge assembly includes a main member having a main cam member and a bore extending generally along an axis of rotation. A pivot member, fixed to an end of a shaft extending through the bore, includes a pivot cam member and is rotatable with respect to the main member. At least one torque element is rotatably engaged with the shaft and is substantially rotationally fixed with respect to the main member. The at least one torque element imparts a first frictional resistance to the shaft with rotation of the shaft in a first direction and a second frictional resistance to the shaft with rotation of the shaft in a second direction. The first frictional resistance is greater than the second frictional resistance. Interaction of the main cam member with the pivot cam member assists in maintaining the hinge assembly in at least first and second positions.

24 Claims, 5 Drawing Sheets

U.S. PATENT DOCUMENTS

| | | | |
|---|---|---|---|
| 6,928,700 B2 * | 8/2005 | Huong | 16/342 |
| 6,941,617 B2 | 9/2005 | Pinto | |
| 6,983,514 B2 * | 1/2006 | Lu et al. | 16/342 |
| 6,988,294 B2 * | 1/2006 | Birtley | 16/342 |
| 7,065,834 B2 | 6/2006 | Lowry | |
| 2002/0042970 A1 * | 4/2002 | Liao | 16/337 |
| 2002/0167789 A1 | 11/2002 | Novin et al. | |
| 2006/0048338 A1 | 3/2006 | Lowry et al. | |

* cited by examiner

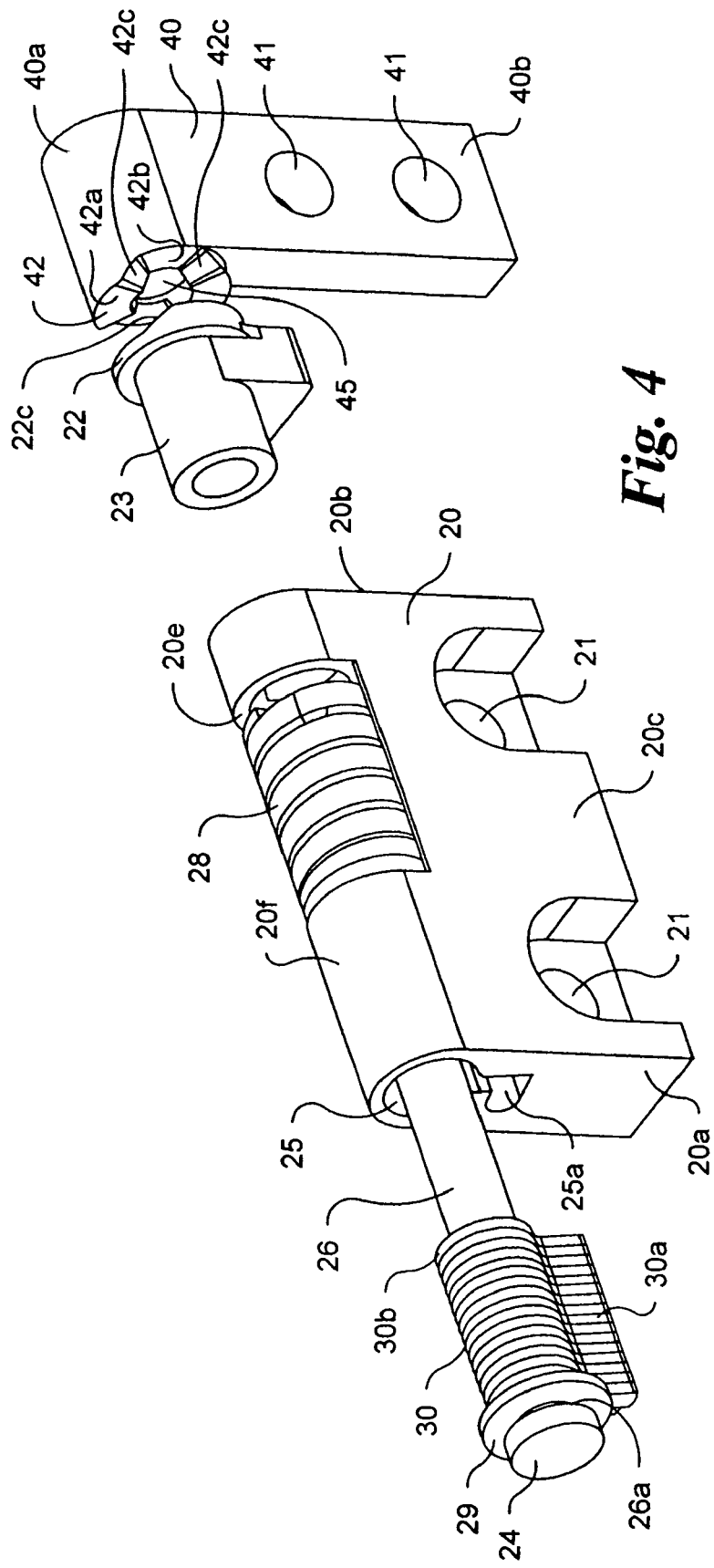

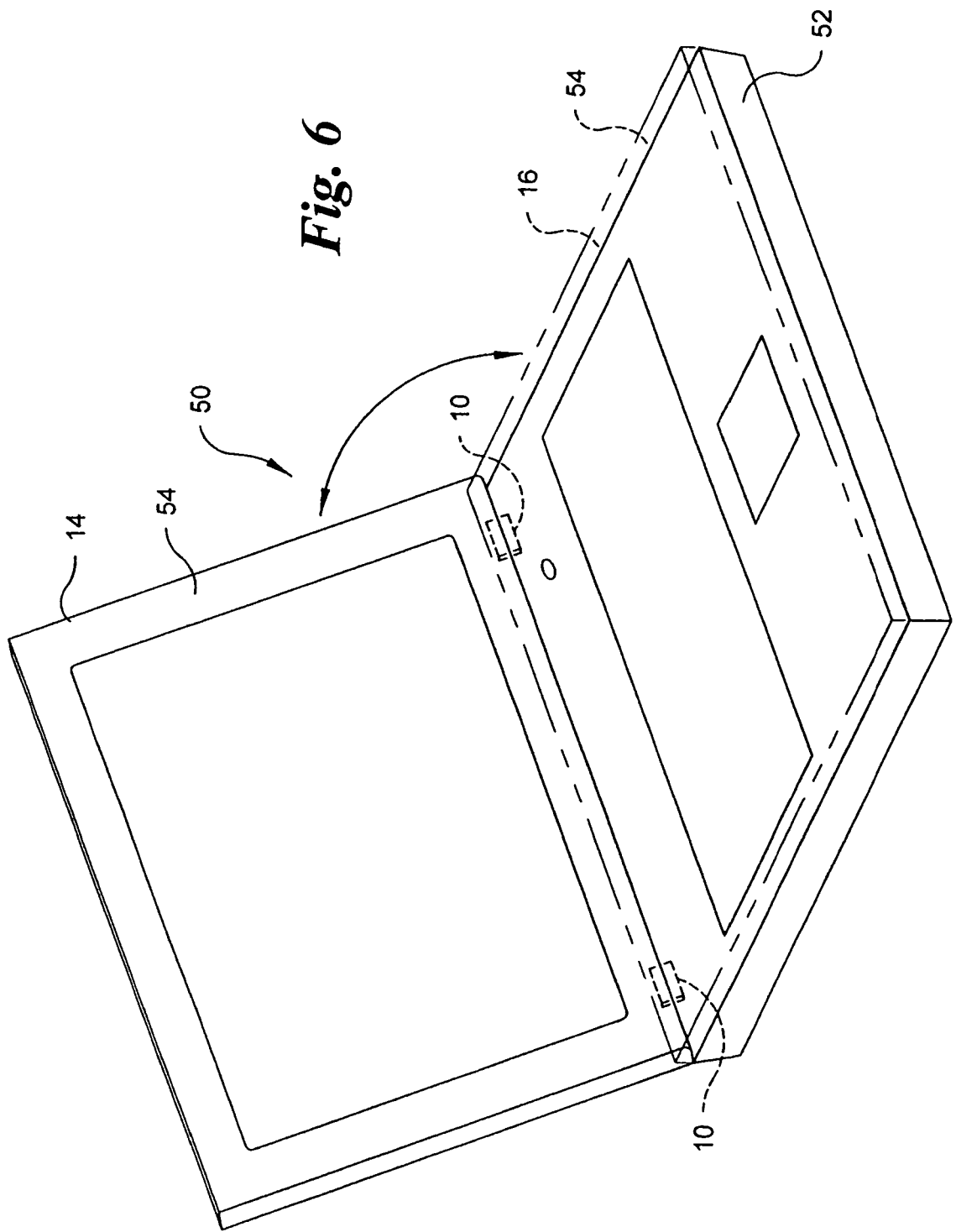

ured life. The hinge uses a cam surface and a cam follower urged toward the cam surface by a spring to hold either a closed position or an open position between 130 degrees and 160 degrees relative to the device housing. Although extensively used in clamshell-style phones, this type of hinge has limited usefulness in applications which prefer a different amount of torque for closing a device than for opening a device.

SELF-LATCHING HINGE ASSEMBLY

CROSS-REFERENCE TO RELATED APPLICATIONS

This application claims the benefit of U.S. Provisional Patent Application No. 60/590,690, entitled "Self-Latching Hinge", filed Jul. 24, 2004, which is incorporated herein by reference.

BACKGROUND OF THE INVENTION

This invention generally relates to hinges and, more particularly, to self-latching hinges for use in notebook computers, automobiles, furniture, or the like.

In certain hinge applications, it is desirable to provide a hinge which can maintain a hinged member in an open position or a closed position. When the hinged member is in the open position, in certain applications, such as clamshell-style phones and notebook computers, it is desirable that the hinged member be held stably in position. It is also desirable in such applications that the hinge maintain the hinged member in a closed position relative to the device housing for storage and transport. Generally in such applications, the open position is set at a fixed, predetermined angle.

One known relatively inexpensive, preassembled, self-containing, two-position hinge can hold a hinged member in a first, open position or a second, closed position relative to a device housing without imparting an axial load on the hinged member or the device housing, thereby resulting in a long operating life. The hinge uses a cam surface and a cam follower urged toward the cam surface by a spring to hold either a closed position or an open position between 130 degrees and 160 degrees relative to the device housing. Although extensively used in clamshell-style phones, this type of hinge has limited usefulness in applications which prefer a different amount of torque for closing a device than for opening a device.

In another known hinge which was designed for use in notebook computers, a higher torque is required to open the notebook computer than is required to close it. The higher torque is required in the opening direction to offset the weight of the display and allow it to be positionable at a multitude of angles with respect to the bottom housing of the notebook computer. However, this configuration requires a user to use two hands in opening the notebook computer. Also, a latch is generally required in order to ensure that the notebook computer remains closed.

It is desirable to provide a self-latching hinge which requires a higher torque in the closing direction than in the opening direction in order to allow for one-handed opening of the hinge while at the same time having minimal laxity in the open position so that a device can maintain a particular orientation when opened. It would also be desirable to have latchless closing of the device in which the hinge is installed.

BRIEF SUMMARY OF THE INVENTION

Briefly stated, the present invention is a hinge assembly comprising a main member having a main cam member and a bore extending generally along an axis of rotation of the main member. A shaft extends through the bore along the axis of rotation. The shaft has an end. A pivot member is fixed to the end of the shaft and is rotatable with respect to the main member. The pivot member has a pivot cam member that abuts the main cam member. At least one torque element is engaged with the shaft and is substantially rotationally fixed with respect to the main member. The shaft is rotatable with respect to the at least one torque element. The at least one torque element imparts a first frictional resistance to the shaft with rotation of the shaft in a first direction and a second frictional resistance to the shaft with rotation of the shaft in a second direction. The first frictional resistance is greater than the second frictional resistance. Interaction of the main cam member with the pivot cam member assists in maintaining the hinge assembly in at least first and second positions.

In another aspect, the present invention is a self-latching hinge assembly for a notebook computer having a base and a pivotable display screen. The hinge assembly comprises a main member engaged with the base of the notebook computer. The main member has a main cam member and a bore extending generally along an axis of rotation of the main member. A shaft extends through the bore along the axis of rotation. The shaft has an end. A pivot member is engaged with the display screen of the notebook computer and is fixed to the end of the shaft so that the pivot member is rotatable with respect to the main member. The pivot member has a pivot cam member that abuts the main cam member. At least one torque element is engaged with the shaft and is substantially rotationally fixed with respect to the main member. The shaft is rotatable with respect to the at least one torque element. The at least one torque element imparts a first frictional resistance to the shaft with rotation of the shaft in a first direction and a second frictional resistance to the shaft with rotation of the shaft in a second direction. The first frictional resistance is greater than the second frictional resistance. Interaction of the main cam member with the pivot cam member assists in maintaining the display screen in at least a closed position with respect to the base.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings:

FIG. 4 is an exploded front perspective view of the hinge assembly of FIG. 1;

FIG. 6 is a front right perspective view of a notebook computer in which the hinge assembly of FIG. 1 can be used.

DETAILED DESCRIPTION OF THE INVENTION

Figure 1:
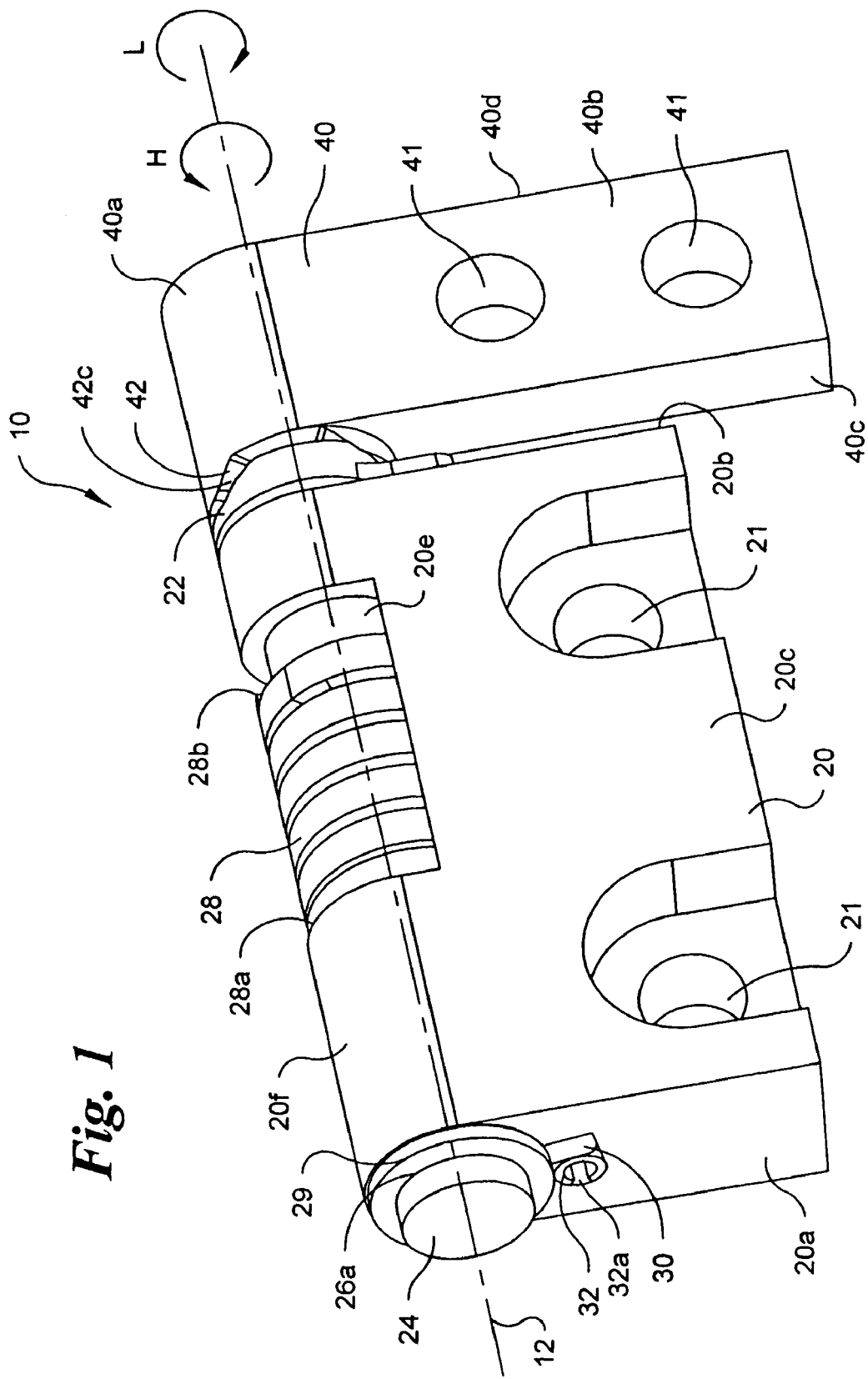
FIG. 1 is a perspective view of a hinge assembly in accordance with a preferred embodiment of the present invention.
Figure 3:
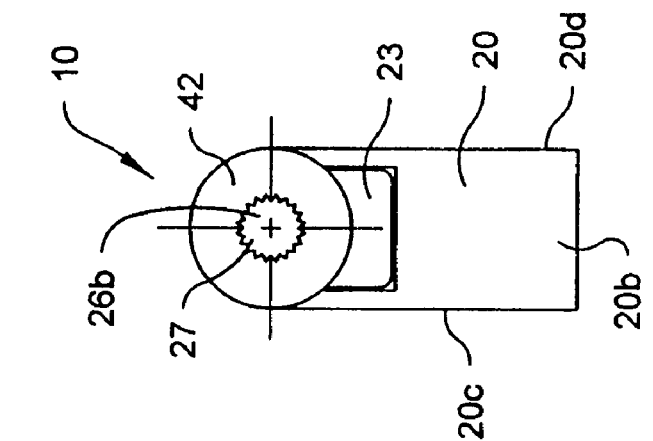
FIG. 3 is a right-side elevational view of the hinge assembly of FIG. 2.

Certain terminology is used in the following description for convenience only and is not limiting. The words "right," "left," "lower," and "upper" designate directions in the drawings to which reference is made. The words "inwardly" and "outwardly" refer to directions toward and away from, respectively, the geometric center of the hinge assembly in accordance with the present invention and designated parts thereof. The terminology includes the words above specifically mentioned, derivatives thereof, and words of similar import.

Referring to the drawings in detail, wherein like numerals indicate like elements throughout, there is shown in FIGS. 1-6 a preferred embodiment of a hinge assembly, indicated generally at 10, in accordance with the present invention. Referring to FIG. 1, the hinge assembly 10 can be seen fully assembled. The hinge assembly 10 has a main member 20 and a pivot member 40 pivotably attached thereto about an axis of rotation 12.

Referring now to FIGS. 1-6, the main member 20 is generally in the form of a parallelepiped having a generally semi-circular rounded top 20f having a center along the axis of rotation 12. The main member 20 further has a left side 20a and a right side 20b. Extending through the main member 20 from the left side 28 to the right side 20b is a bore 25 located proximate the top 20f of the main member 20 and generally having an axial center line coincident with the axis of rotation 12, such that the bore 25 extends generally along the axis of rotation 12 of the main member 20. Extending through the main member 20 from a front surface 20c to a back surface 20d are main member apertures 21 through which attachment members (not shown) such as bolts, screws, or the like can be placed to attach the main member 20 to a device housing, such as, but not limited to a base 52 of a notebook computer 50 (see FIG. 6). Although two main member apertures 21 are presently portrayed, this is not intended to be limiting as it is within the spirit and scope of the present invention to have more or less than two main member apertures 21.

A cam insert 23 is slideably, non-rotatably engaged at least partially within the bore 25 at the right side 20b of the main member 20. The cam insert 23 is longitudinally slideable along the axis of rotation 12. Attached to a right side of the cam insert 23 is a generally circular main cam member 22 aligned such that the axis of rotation 12 goes through a center of the main cam member 22. In this way, the main cam member 22 is engaged with the main member 20. The main cam member 22 has a cam surface defining at least one protrusion 22a and at least one depression 22b. However, it is preferable that the main cam member have two protrusions 22a and two depressions 22b.

Referring to FIGS. 1 and 4-6, the pivot member 40 has a generally tubular top portion 40a and a bottom portion 40b extending therefrom, the bottom portion 40b being generally in the form of a parallelepiped. Extending through the bottom portion 40b are two pivot member apertures 41 through which attachment members (not shown) such as screws, bolts, or the like can be placed in order to attach the pivot member 40 to a hinged member such as a pivotable display screen 54 of the notebook computer 50 (see FIG. 6). Although two pivot member apertures 41 are portrayed, it is not intended to be limiting, as it is within the spirit and scope of the present invention to have more or less than two pivot member apertures 41. Engaged to a left side 40c of the top portion 40a is a generally circular pivot cam member 42 having a cam surface defining at least one protrusion 42a and at least one depression 42b. Preferably, the pivot cam member 42 has two protrusions 42a and two depressions 42b. A bore 45 extends through the top portion 40a of the pivot member 40, from the center of the pivot cam member 42 at the left side 40c to a right side 40d.

Referring again to FIGS. 1-5, the main member 20 pivotably engages with the pivot member 40. The pivot member 40 is pivotable about the axis of rotation 12. Preferably, a shaft 26 extends through the bore 25 along the axis of rotation 12 outwardly from the left side 20a of the main member 20, through the cam insert 23, out from the center of the main cam member 22, and into the pivot member 40 through the bore 45 at the center of the pivot cam member 42, thereby rotationally engaging the pivot member 40 with the main member 20. The shaft 26 has oppositely disposed first and second ends 26a, 26b.

The shaft 26 has a cap 24 engaged with the first end 26a of the shaft 26. A washer 29 is preferably located on the shaft 26 between the cap 24 and the main member 20 to abut the left side 20a of the main member 20 and prevent the cap 24 and the shaft 26 from sliding within the bore 25. Alternatively, it is within the spirit and scope of the present invention that the cap 24 be sufficiently large so as to abut the left side 20a of the main member 20 and prevent the shaft 26 from sliding within the bore 25, thereby eliminating the need for the washer 29. The second end 26b of the shaft 26 preferably has axially extending splines 27 that engage with the pivot member 40 to fix the pivot member 40 to the second end 26b of the shaft 26 and to ensure that rotation of the pivot member 40 with respect to the main member 20 will cause rotation of the shaft 26. Preferably, a portion of the second end 26b is flattened to complete the assembly of the hinge assembly 10. Flattening of the portion of the second end 26b forms a flange that abuts the right side 40d of the pivot member 40 to maintain the pivotable engagement of the main member 20 with the pivot member 40 and prevent the pivot member 40 from falling off of the shaft 26. Although flattening of the second end 26b is the preferred method for maintaining the pivotable engagement of the pivot member 40 with the main member 20, it is within the spirit and scope of the present invention that the engagement be maintained in other ways, such as affixing a cap, cotter pin, or the like to the second end 26b to abut the right side 40d of the pivot member 40.

Figure 2:
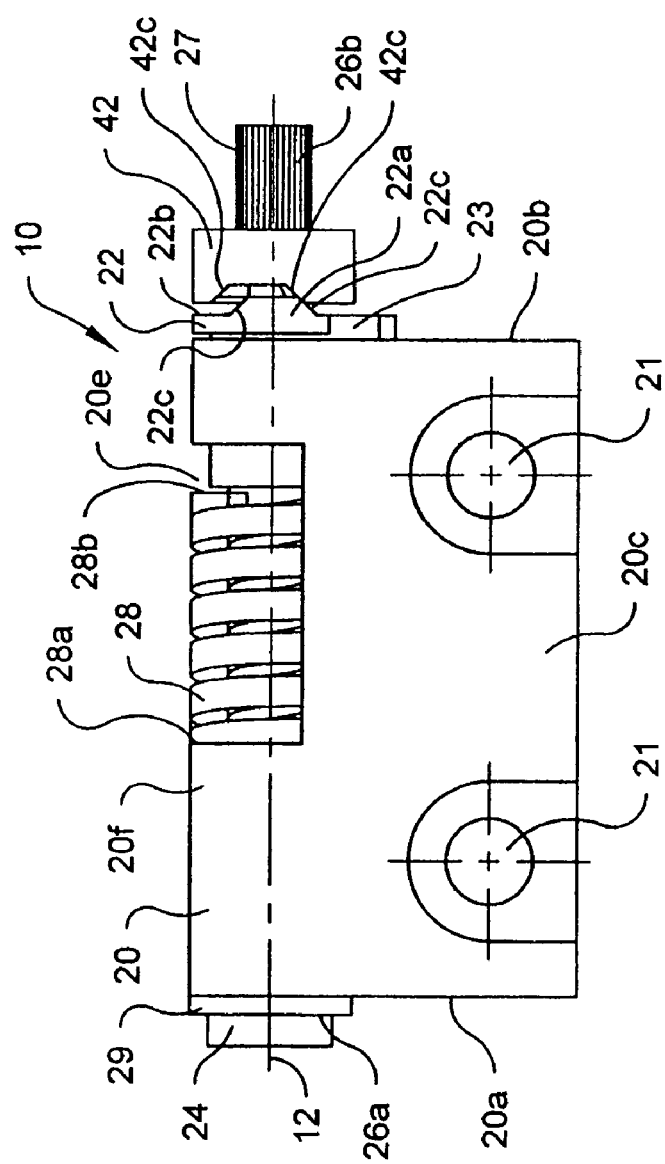
FIG. 2 is a front elevational view of the hinge assembly of FIG. 1 with a pivot member removed.

Referring specifically to FIGS. 1-2, a spring 28 is within a recess 20e within the top 20f of the main member 20. Preferably, the spring 28 has a central axis that is coincident with the axis of rotation 12, such that, when the hinge assembly 10 is fully assembled, the shaft 26 extends through the center of the spring 28. A first end 28a of the spring 28 abuts a portion of the main member 20, and a second end 28b of the spring 28 abuts the left side of the cam insert 23 so as to rightwardly bias the cam insert 23 and the main cam member 22 with respect to the main member 20 along the shaft 26 and the axis of rotation 12.

When the hinge assembly 10 is fully assembled, the main cam member 22 abuts the pivot cam member 42 such that the protrusions 22a of the main cam member 22 correspond with the depressions 42b of the pivot cam member 42 and the protrusions 42a of the pivot cam member 42 correspond with the depressions 22b of the main cam member 22. Pivotable movement of the pivot member 40 causes the surface of the pivot cam member 42 to ride along the surface of the main cam member 22, causing axial sliding motion of the cam insert 23 along the axis of rotation 12 from an outward position (corresponding to the protrusions 22a of the main cam member within the depressions 42b of the pivot cam member 42) to an inward position (corresponding to the protrusions 22a of the main cam member 22 abutting the protrusions 42a of the pivot cam member 42). Outwardly biasing the cam insert 23 ensures that the main cam member 22 maintains an abutting relationship with the pivot cam member 42. In this way, interaction of the main cam member 22 and the pivot cam member 42 causes the cam insert 23 to slide axially along the axis of rotation 12, and preferably along at least a portion of the shaft 26, during rotation of the pivot member 40 with respect to the main member 20.

Interaction of the main cam member 22 with the pivot cam member 42 assists in maintaining the hinge assembly 10 in at least first and second positions 14, 16. Specifically, engagement of the at least one protrusion 22a of the main cam member 22 with the at least one depression 42b of the pivot cam member 42 maintains the hinge assembly 10 in at least one of the first and second positions 14, 16. Preferably, the main cam member 22 and the pivot cam member 42 each have two protrusions 22a, 42a and two depressions 22b, 42b, so that interaction of the main cam member 22 with the pivot cam member 42 enables the hinge assembly 10 to be maintained in each of the first and second positions 14, 16. Additionally, the protrusions 22a, 42a of each of the main cam member 22 and the pivot cam member 42 have inclined sides 22c, 42c, so that interaction of the respective inclined sides 22c, 42c of the protrusions 22a, 42a of the main cam member 22 and the pivot cam member 42 at least assist in urging the hinge assembly 10 to at least one of the first and second positions 14, 16. The interaction of the main cam member 22 and the pivot cam member 42 will be described in more detail below.

Figure 5:
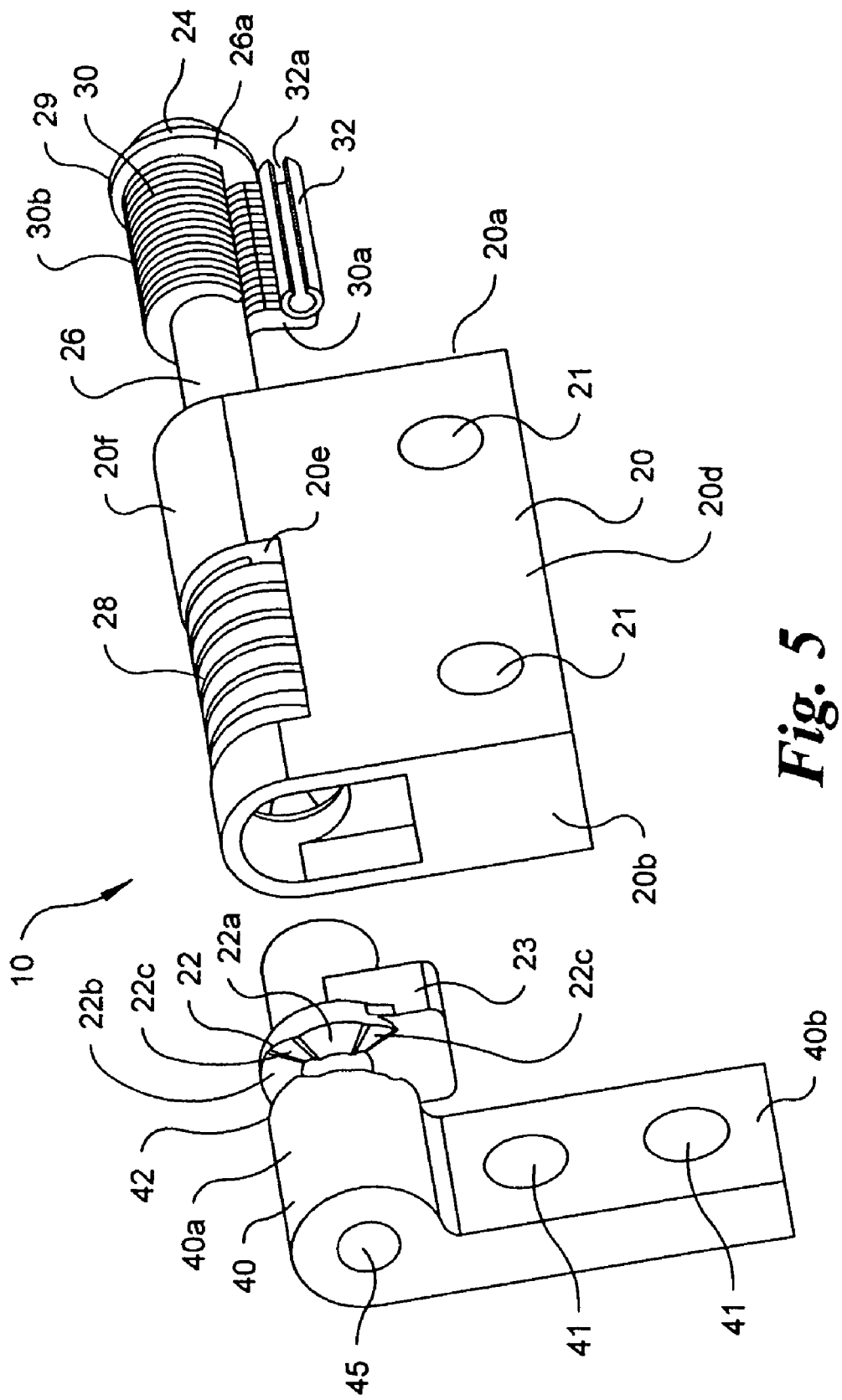
FIG. 5 is an exploded rear perspective view of the hinge assembly of FIG. 1.

Referring now to FIGS. 4-5, at least one and, preferably, a plurality of torque elements 30 are engaged with the shaft 26 proximate the first end 26a, such that the shaft 26 is rotatable with respect to the torque elements 30. The torque elements 30 are preferably substantially rotationally fixed with respect to the main member 20. Each torque element 30 is generally question-mark shaped having a wrapped portion 30b that wraps around the shaft 26 with an interference fit and a tab 30a that extends generally outwardly at a right angle from the wrapped portion 30b (radially outwardly from the shaft 26 when the torque element 30 is engaged with the shaft 26). The bore 25 is appropriately shaped so as to accommodate the shaft 26 with the torque elements 30 engaged therewith. The bore 25 has a slot 25a extending from the left side 20a of the main member 20 to a distance rightward from the left side 20a. The cross-section of the bottom portion is generally D-shaped to accommodate the tabs 30a of the torque elements 30 as well as a compression tube 32. The compression tube 32 is pressed into the slot 25a to abut the tabs 30a of the torque elements 30 and constrain the tabs 30a within the slot 25a of the main member 20. In this way, the compression tube 32 provides a tight fit of the tabs 30a within the slot 25a to reduce, if not eliminate, backlash in the hinge assembly 10, thereby substantially rotationally fixing the torque elements 30 with respect to the main member 20. The compression tube 32 is preferably a rolled sheet of metal being generally tube-shaped with a gap 32a between the ends. Although it is preferable that the compression tube 32 be made of metal, it is within the spirit and scope of the present invention that the compression tube 32 be made of another generally rigid material such as a molded polymeric material or plastic.

Referring now to FIGS. 1, 4, and 5, the use of torque elements 30 in the assembled hinge assembly 10 results in a greater amount of torque being required to rotate the shaft 26 in one direction and a lesser amount of torque being required to rotate the shaft 26 in the other direction. This result is necessitated by the geometry of the torque elements 30. An initial stress is created between the shaft 26 and the torque elements 30 due to the interference fit therebetween. This initial stress creates frictional resistance that tends to inhibit rotation of the shaft 26 within the torque elements 30 in either direction.

However, rotation of the pivot member 40 in a first, high-torque direction (denoted by arrow H in FIG. 1) results in the torque elements 30 imparting a first frictional resistance against the rotation of the shaft 26 that is greater than that caused by the initial stress alone. This increased frictional resistance is caused because rotation of the shaft 26 in the high-torque direction H corresponds to a wrapping direction of the wrapped portions 30b, which tends to increase the wrapping engagement of the torque elements 30 with the shaft 26. In effect, additional stress is created between the torque elements 30 and the shaft 26, which is added to the above-described initial stress. This additional stress creates greater surface pressure between the shaft 26 and the torque elements 30 which increases the frictional resistance against the rotation of the shaft 26. In this way, an increased amount of torque is required to overcome the frictional resistance in order to rotate the pivot member 40 in the high-torque direction H.

Similarly, rotation of the pivot member 40 in a low-torque direction (denoted by arrow L in FIG. 1) results in the torque elements 30 imparting a second frictional resistance against the rotation of the shaft 26 that is less than that caused by the initial stress alone. Essentially, rotation of the shaft 26 in the low-torque direction L corresponds to an unwrapping direction of the wrapped portions 30b, which tends to decrease the wrapping engagement of the torque elements 30 with the shaft 26. The stress between the torque elements 30 and the shaft 26 is decreased, which is subtracted from the above-described initial stress. Decreased stress translates to decreased surface pressure between the shaft 26 and the torque elements 30 which decreases the frictional resistance against the rotation of the shaft 26. In this way, a decreased amount of torque is required to overcome the frictional resistance in order to rotate the pivot member 40 in the low-torque direction L.

In operation, at least one hinge assembly 10 is located within a clamshell-type device, such as, but not limited to a notebook computer 50 (see FIG. 6), having a device housing or base 52 and a hinged member, such as, but not limited to a pivotable display screen 54, pivotable with respect to the base 52. The main member 20 of the hinge assembly 10 is secured to the device housing and the pivot member 40 is secured to the hinged member. The hinged member is designed to open and close such that the angle between the hinged member and the device housing is zero degrees when closed and up to 135 degrees when opened. When opening the device, it is preferable that the device housing be placed generally flat and that the hinged member be rotated open. It is further preferable that the hinge assembly 10 be oriented within the device so that the pivot member 40 is turned in the low-torque direction L in the opening direction such that the torque elements 30 impart a lesser degree of resistance to the rotation of the shaft 26. In this way, a user will only have to lift up on the hinged member with a minimal amount of force to overcome the resistance of the torque elements 30 and open the hinged member. Preferably, the interaction of the main cam member 22 and the pivot cam member 42 maintains the device in an open position, such as, for instance, the first position 14 of the notebook computer 50 (see FIG. 6). This is preferably accomplished by the protrusions 42a of the pivot cam member 42 being situated completely within the depressions 22b of the main cam member 22.

When closing the device, the hinged member is rotated in the high-torque direction H. Therefore, when closing the device, the user must apply a greater amount of force on the hinged member in order to overcome the resistance of the torque elements 30 and to overcome resistance imparted by the interaction between the main cam member 22 and the pivot cam member 22. Due to the interaction of the main cam member 22 and the pivot cam member 42, this greater amount of force need only be applied until the angle between the hinged member and the device housing is about twenty degrees, at which point, the protrusions 22a, 42a of the hinge assembly 10 abut each other so that no additional force is required to overcome the interaction between the main cam member 22 and the pivot cam member 42 and the weight of the hinged member is adequate to create a torque great enough to overcome the resistance of the torque elements 30. In this way, the hinged member closes in a controlled freefall while the protrusions 22a, 42a abut each other (from about twenty degrees to about ten degrees). When the angle between the hinged member and the device housing is about ten degrees, the protrusion 42a of the pivot cam member 42 begins riding down the inclined surface 22c into the depression 22b of the main cam member 22, further increasing the rate of closure of the device and effectively driving the hinged member closed to an angle of zero degrees from the device housing. At zero degrees, the protrusions 42a of the pivot cam member 42 are situated completely within the depressions 22b of the main cam member 22, effectively latching the hinged member in a closed position, such as, for instance, the second position 16 of the notebook computer 50 (see FIG. 6).

In this way, the device maintains the hinged member in an open position through frictional resistance primarily from the torque elements 30 (approximately 80%) and having a contribution from the cam to cam-follower interaction between the main cam member 22 and the pivot cam member 42 (approximately 20%). The frictional resistance overcomes the weight of the hinged member to enable it to be held in the open position. However, once the hinged member is rotated to within about twenty degrees of being closed, the amount of frictional resistance from the cam to cam-follower interaction between the main cam member 22 and the pivot cam member 42 (i.e., the protrusions 22a, 42a in abutting relationship) decreases and the weight of the hinged member is generally sufficient to overcome the resulting frictional resistance, such that the hinged member generally begins to close on its own. At about ten degrees, detent torque from the cam to cam-follower interaction between the main cam member 22 and the pivot cam member 42 (i.e., the protrusions 22a, 42a riding down into the depressions 22b, 42b) dominates the frictional resistance of the torque elements 30 to actively close the device, thereby effectively latching the device in the closed position.

The above-described hinge assembly 10 can be used in connection with electronic devices (not shown) such as cellular phones, personal digital assistants, and other hinged handheld electronic devices in which the elimination of a separate latch would be desirable. Additionally, the hinge assembly 10 can be constructed of sufficient strength that it can also be used in larger electronic devices (not shown), such as notebook computers 50 and the like, to maintain their respective hinged members (i.e., LCD displays) in an open position. Regardless of the application for which it is used, the hinge assembly 10 is sufficiently strong to be able to hold the device in a closed position without the use of a separate latch.

Referring specifically to FIG. 6, although equally applicable with respect to any hinged electronic device, the following sets forth the use of the hinge assembly 10 in a notebook computer 50 having a pivotable display screen 54 pivotably connected to a computer housing or base 52. Preferably, the main member 20 is engaged with the base 52 of the notebook computer 50 and the pivot member 40 is engaged with the display screen 54. The interaction of the pivot cam member 42 with the main cam member 22 allows for the hinged display to remain closed during transportation and other such activities during which it is desired that the notebook computer remain closed in the second position 16, even though there is no separate latch member (not shown). That is, the self-latching hinge assembly 10 enables the notebook computer 50 to be maintained in the closed, second position 16 without the need for a separate latch member.

Also, placement of the notebook computer in the open, first position 14 can be accomplished using only one hand, due to the low-torque direction L coinciding with the opening direction. The user need not use the other hand to unlatch a latch or hold down the computer housing while opening the hinged display. When closing the notebook computer, the user pivots the hinged display in the high-torque direction H such that the force required to move the hinged display from its limit of 135 degrees down to approximately twenty degrees is greater than that which was required to open it. Due to the geometry of the pivot cam member 42 and the main cam member 22, the hinged display closes in a controlled freefall from approximately twenty degrees to approximately ten degrees, and then drives into the closed, second position 16 from approximately ten degrees to zero degrees. In this way, the notebook computer is self-latching at ten degrees.

Furthermore, although the use of the hinge assembly 10 in electronic devices is described above, it is not intended to be limiting. Therefore, it is within the spirit and scope of the present invention that the hinge assembly 10 be used in other applications in which it would be desirable to eliminate the need for a separate latch, such as automotive closures, furniture closures, and the like.

It will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention, as set forth in the appended claims.

We claim:

1. A hinge assembly, comprising:
   a main member having a main cam member and a bore extending generally along an axis of rotation of the main member;
   a shaft extending through the bore along the axis of rotation, the shaft having an end;
   a pivot member fixed to the end of the shaft and rotatable with respect to the main member, the pivot member having a pivot cam member that abuts the main cam member;
   at least one torque element engaged with the shaft and substantially rotationally fixed with respect to the main member, the shaft being rotatable with respect to the at least one torque element with the at least one torque element imparting a first frictional resistance to the shaft with rotation of the shaft in a first direction and a second frictional resistance to the shaft with rotation of the shaft in a second direction, the first frictional resistance being greater than the second frictional resistance, wherein interaction of the main cam member with the pivot cam member assists in maintaining the hinge assembly in at least first and second positions;
a cam insert on which the main cam member is disposed, the cam insert being disposed at least partially within the bore of the main member and slideable along the axis of rotation of the main member; and
a spring abutting the cam insert to bias the cam insert along the axis of rotation, wherein the cam insert slides axially along the axis of rotation during rotation of the pivot member with respect to the main member due to the interaction between the main cam member and the pivot cam member.

2. The hinge assembly of claim 1, wherein the shaft extends through the cam insert, such that the cam insert slides axially along the shaft due to the interaction between the main cam member and the pivot cam member.

3. The hinge assembly of claim 2, wherein the shaft extends through the main cam member of the cam insert.

4. The hinge assembly of claim 1, wherein the spring has a central axis which is coincident with the axis of rotation, such that the shaft extends through the spring.

5. The hinge assembly of claim 1, wherein the shaft extends outwardly from the main member.

6. The hinge assembly of claim 1, wherein the main cam member and pivot cam member each include at least one protrusion and one depression, with engagement of the at least one protrusion of the main cam member with the at least one depression of the pivot cam member maintaining the hinge assembly in at least one of the first and second positions.

7. The hinge assembly of claim 6, wherein the at least one protrusion of each of the main cam member and pivot cam member have inclined sides, wherein interaction of the respective inclined sides of the protrusions of the main cam member and pivot cam member at least assist in urging the hinge assembly to at least one of the first and second positions.

8. A hinge assembly, comprising:
a main member having a main cam member and a bore extending generally along an axis of rotation of the main member;
a shaft extending through the bore along the axis of rotation, the shaft having an end;
a pivot member fixed to the end of the shaft and rotatable with respect to the main member, the pivot member having a pivot cam member that abuts the main cam member; and
at least one torque element engaged with the shaft and substantially rotationally fixed with respect to the main member, the shaft being rotatable with respect to the at least one torque element with the at least one torque element imparting a first frictional resistance to the shaft with rotation of the shaft in a first direction and a second frictional resistance to the shaft with rotation of the shaft in a second direction, the first frictional resistance being greater than the second frictional resistance, wherein interaction of the main cam member with the pivot cam member assists in maintaining the hinge assembly in at least first and second positions,
wherein the at least one torque element includes a wrapped portion disposed within the bore of the main member for engagement with the shaft and a tab for insertion within a slot of the bore in order to substantially rotationally fix the at least one torque element with respect to the main member.

9. The hinge assembly of claim 8, further comprising a compression tube disposed within the slot of the main member to constrain the tab of the at least one torque element, thereby substantially rotationally fixing the at least one torque element with respect to the main member.

10. The hinge assembly of claim 8, wherein the shaft extends outwardly from the main member.

11. The hinge assembly of claim 8, wherein the main cam member and pivot cam member each include at least one protrusion and one depression, with engagement of the at least one protrusion of the main cam member with the at least one depression of the pivot cam member maintaining the hinge assembly in at least one of the first and second positions.

12. The hinge assembly of claim 11, wherein the at least one protrusion of each of the main cam member and pivot cam member have inclined sides, wherein interaction of the respective inclined sides of the protrusions of the main cam member and pivot cam member at least assist in urging the hinge assembly to at least one of the first and second positions.

13. A self-latching hinge assembly for a notebook computer having a base and a pivotable display screen, the hinge assembly comprising:
a main member engaged with the base of the notebook computer, the main member having a main cam member and a bore extending generally along an axis of rotation of the main member;
a shaft extending through the bore along the axis of rotation, the shaft having an end;
a pivot member engaged with the display screen of the notebook computer and fixed to the end of the shaft so that the pivot member is rotatable with respect to the main member, the pivot member having a pivot cam member that abuts the main cam member;
at least one torque element engaged with the shaft and substantially rotationally fixed with respect to the main member, the shaft being rotatable with respect to the at least one torque element with the at least one torque element imparting a first frictional resistance to the shaft with rotation of the shaft in a first direction and a second frictional resistance to the shaft with rotation of the shaft in a second direction, the first frictional resistance being greater than the second frictional resistance, wherein interaction of the main cam member with the pivot cam member assists in maintaining the display screen in at least a closed position with respect to the base;
a cam insert on which the main cam member is disposed, the cam insert being disposed at least partially within the bore of the main member and slideable along the axis of rotation of the main member; and
a spring abutting the cam insert to bias the cam insert along the axis of rotation, wherein the cam insert slides axially along the axis of rotation during rotation of the pivot member with respect to the main member due to the interaction between the main cam member and the pivot cam member.

14. The self latching hinge assembly of claim 13, wherein the shaft extends through the cam insert, such that the cam insert slides axially along the shaft due to the interaction between the main cam member and the pivot cam member.

15. The self-latching hinge assembly of claim 14, wherein the shaft extends through the main cam member of the cam insert.

16. The self latching hinge assembly of claim 13, wherein the spring has a central axis which is coincident with the axis of rotation, such that the shaft extends through the spring.

17. The self-latching hinge assembly of claim 13, wherein the shaft extends outwardly from the main member.

18. The self-latching hinge assembly of claim 13, wherein the main cam member and pivot cam member each include at least one protrusion and one depression, with engagement of the at least one protrusion of the main cam member with the at least one depression of the pivot cam member maintaining the display screen in at least the closed position.

19. The self-latching hinge assembly of claim 18, wherein the at least one protrusion of each of the main cam member and pivot cam member have inclined sides, wherein interaction of the respective inclined sides of the protrusions of the main cam member and pivot cam member at least assist in urging the display screen to at least the closed position.

20. A self latching hinge assembly for a notebook computer having a base and a pivotable display screen, the hinge assembly comprising:
- a main member engaged with the base of the notebook computer, the main member having a main cam member and a bore extending generally along an axis of rotation of the main member;
- a shaft extending through the bore along the axis of rotation, the shaft having an end;
- a pivot member engaged with the display screen of the notebook computer and fixed to the end of the shaft so that the pivot member is rotatable with respect to the main member, the pivot member having a pivot cam member that abuts the main cam member; and
- at least one torque element engaged with the shaft and substantially rotationally fixed with respect to the main member, the shaft being rotatable with respect to the at least one torque element with the at least one torque element imparting a first frictional resistance to the shaft with rotation of the shaft in a first direction and a second frictional resistance to the shaft with rotation of the shaft in a second direction, the first frictional resistance being greater than the second frictional resistance, wherein interaction of the main cam member with the pivot cam member assists in maintaining the display screen in at least a closed position with respect to the base,
- wherein the at least one torque element includes a wrapped portion disposed within the bore of the main member for engagement with the shaft and a tab for insertion within a slot of the bore in order to substantially rotationally fix the at least one torque element with respect to the main member.

21. The self-latching hinge assembly of claim 20, further comprising a compression tube disposed within the slot of the main member to constrain the tab of the at least one torque element, thereby substantially rotationally fixing the at least one torque element with respect to the main member.

22. The self-latching hinge assembly of claim 20, wherein the shaft extends outwardly from the main member.

23. The self-latching hinge assembly of claim 20, wherein the main cam member and pivot cam member each include at least one protrusion and one depression, with engagement of the at least one protrusion of the main cam member with the at least one depression of the pivot cam member maintaining the display screen in at least the closed position.

24. The self-latching hinge assembly of claim 23, wherein the at least one protrusion of each of the main cam member and pivot cam member have inclined sides, wherein interaction of the respective inclined sides of the protrusions of the main cam member and pivot cam member at least assist in urging the display screen to at least the closed position.

* * * * *